United States Patent [19]

Hayashi

[11] Patent Number: 5,051,843
[45] Date of Patent: Sep. 24, 1991

[54] DIGITAL COPIER
[75] Inventor: Masayuki Hayashi, Kawasaki, Japan
[73] Assignee: Ricoh Company, Ltd., Tokyo, Japan
[21] Appl. No.: 291,044
[22] Filed: Dec. 28, 1988
[30] Foreign Application Priority Data
Dec. 28, 1987 [JP] Japan .................................. 62-332987
[51] Int. Cl.[5] ........................ H04N 1/387; H04N 1/40
[52] U.S. Cl. .................................. 358/450; 358/448; 358/474
[58] Field of Search ............... 358/400, 401, 448, 450, 358/452, 453, 451, 495, 496, 474, 406, 412, 413, 461, 464, 488

[56] References Cited
U.S. PATENT DOCUMENTS 4,342,052 7/1982 Rackley et al. ..................... 358/450
4,570,187 2/1986 Ono et al. ........................... 358/453
4,635,129 1/1987 Miyagi ................................ 358/474

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A digital copier for reducing images printed on a plurality of documents and reproducing the reduced images on a single paper sheet in a desired arrangement. An image forming timing of a scanner and a paper transporting timing of a register roller pair are set up constantly with accuracy by determining a period of time needed for a scanner to move from its original position or home position to a predetermined position and, on the basis of the determined period of time, automatically correcting a variation in the next image forming timing which is ascribable to a change of magnification, for example.

4 Claims, 13 Drawing Sheets

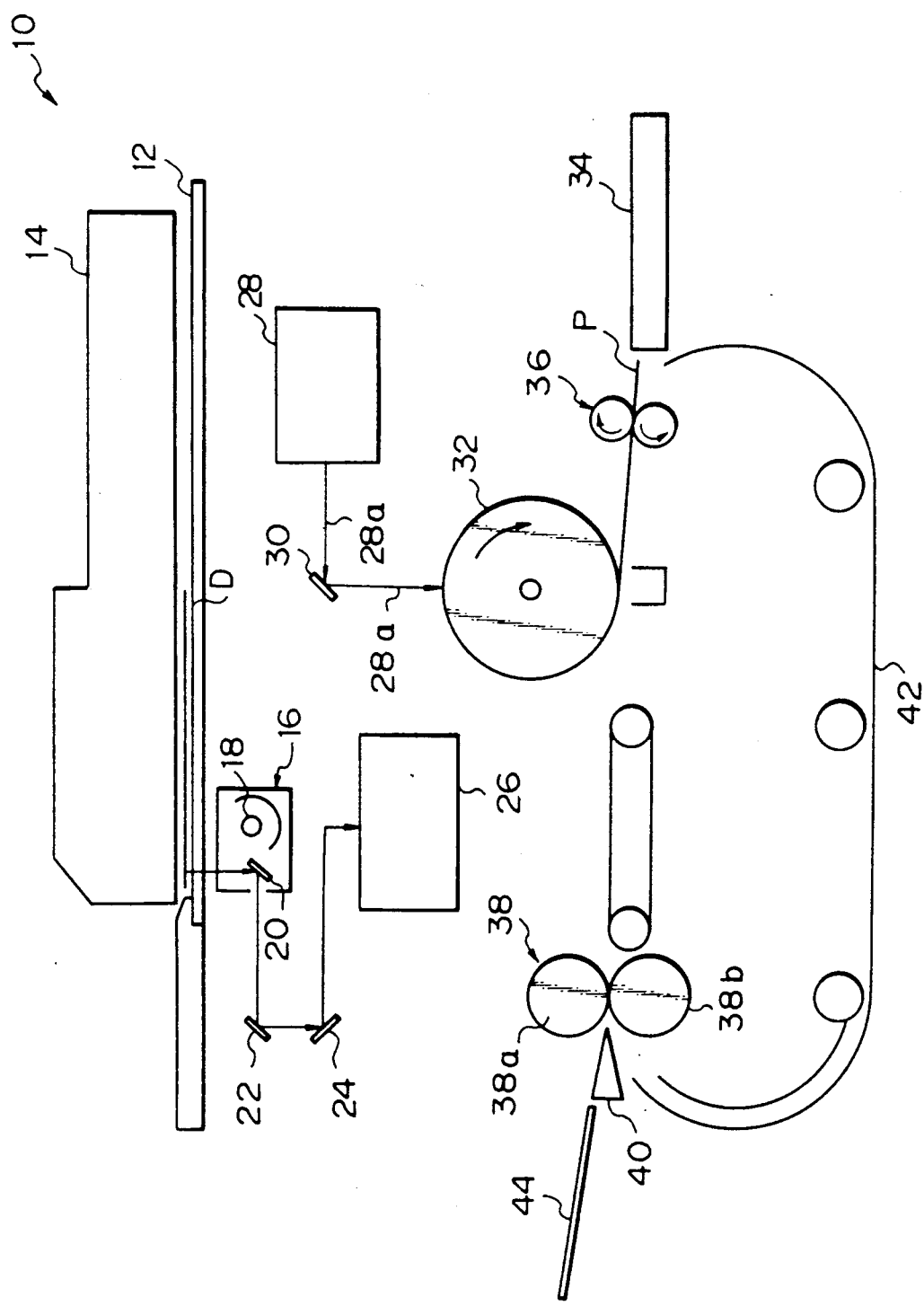

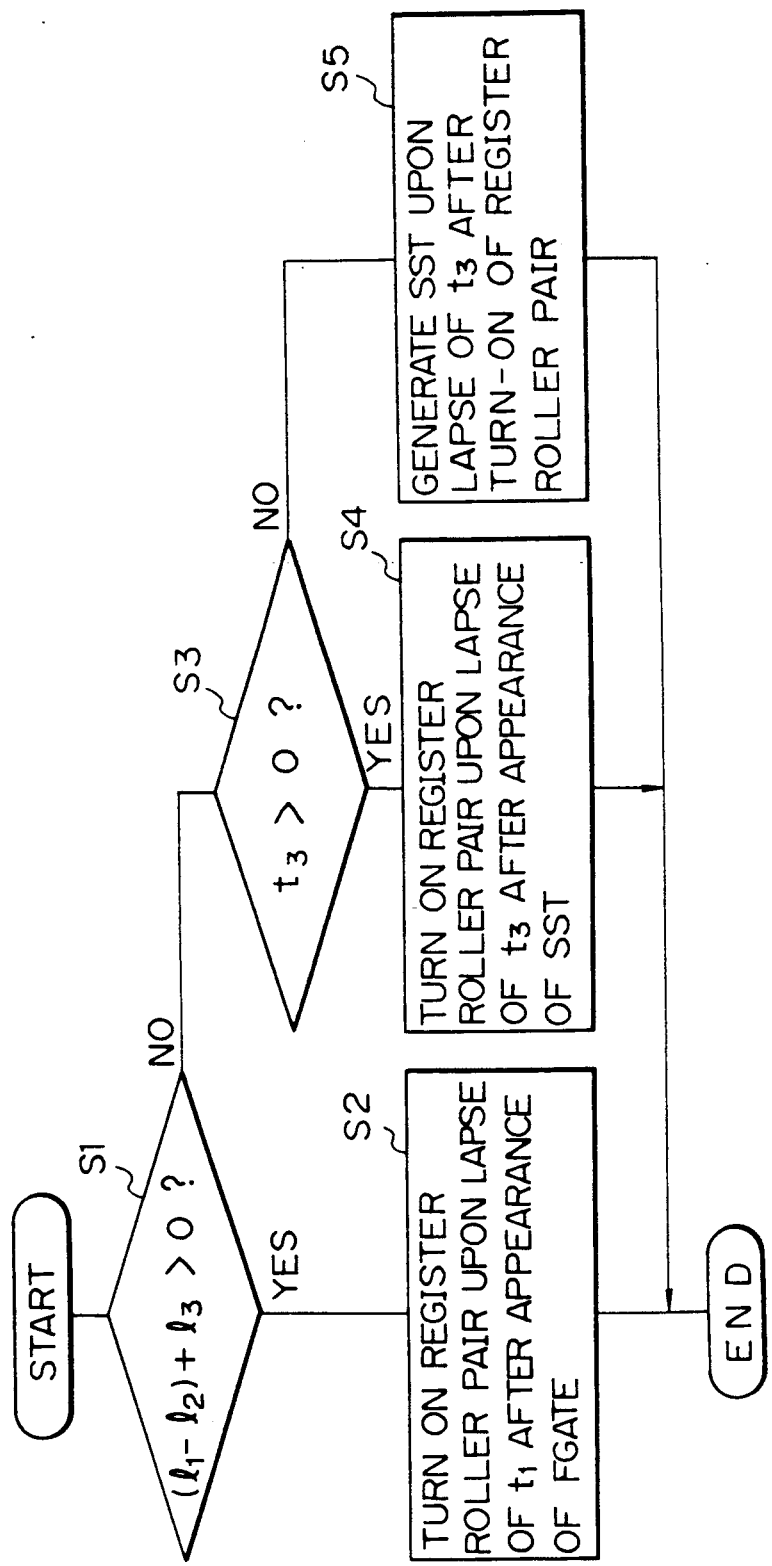

DIGITAL COPIER

BACKGROUND OF THE INVENTION

The present invention relates to a digital copier capable of reproducing images printed on a plurality of documents on a single paper sheet in a desired arrangement by reducing the images of the documents individually.

With a copier or similar image recorder for recording an image printed on a document on a paper sheet, it is often desired to reduce images of a plurality of, such as four, documents of format A4 and reproducing them on a single paper sheet of format A4 in a particular arrangement. Traditionally, this kind of reproduction has been implemented by copying each document in a reduced size, then cutting off the resulting copies, then gluing them to a single board, and then copying the board by one magnification. Since such a procedure is time- and labor-consuming, presently under development in the art is a copier having a capability for automatically copying individual documents in a reduced size on a single paper while arranging them on the paper sheet as desired.

A prerequisite with a copier of the type described is that the timing for a scanner to scan a document and the timing for a paper sheet to be driven by register rollers be maintained with accuracy. Otherwise, images printed on individual documents would be prevented from being accurately positioned on a single paper sheet. However, since the speed and distance of movement of a scanner is effected by machining accuracy and, yet, has to be changed depending upon magnification, it is necessary to automatically correct the scanning condition. None of the copiers presently on the market is capable of meeting such a requirement.

SUMMARY OF THE INVENTION

It is therefore an object of the present invention to provide a digital copier capable of reproducing a plurality of document images on a single paper sheet by setting up an image forming timing and a paper transporting timing of register rollers with accuracy at all times.

It is another object of the present invention to provide a generally improved digital copier.

A digital copier for reading images printed on a plurality of documents by use of a document reader and reproducing the read images in a desired arrangement on a single paper sheet which is transported by way of a register roller pair of the present invention comprises a data processing circuit for determining, in the event of a scanning movement of the document reader, a period of time needed for the document reader to move from a home position to a predetermined position and holding data representative of the determined period of time, and a correcting circuit for correcting a variation in a scanning timing of the document reader on the basis of the held data.

BRIEF DESCRIPTION OF THE DRAWINGS

The above and other objects, features and advantages of the present invention will become more apparent from the following detailed description taken with the accompanying drawings in which:

FIG. 2 is a fragmentary side elevation schematically showing a digital copier;

FIGS. 8 and 9 are flowcharts demonstrating a control procedure and correcting conditions;

DESCRIPTION OF THE PREFERRED EMBODIMENTS

Figures 1A, 1B, 1C, 1D:
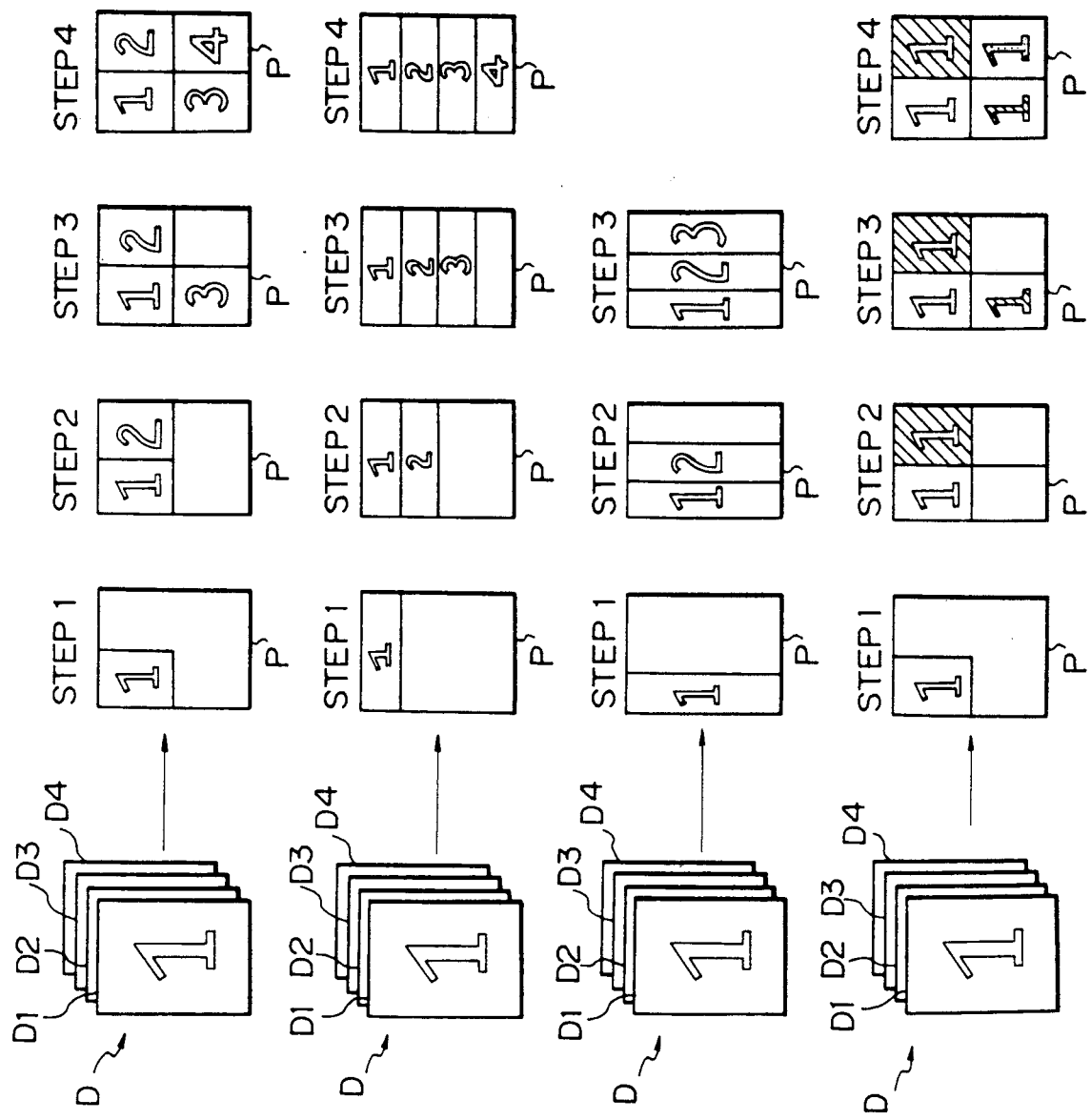
FIGS. 1A to 1D are schematic views each showing a different condition in which images printed on of a plurality of documents may be reduced in size and reproduced on a single paper sheet.

Referring to FIGS. 1A to 1D, there are shown four different conditions in which all or part of images "1", "2", "3" and "4" individually carried on four different documents D1 to D4 may be reproduced on a single paper sheet P in a reduced size. In FIG. 1A, the documents D1 to D4 are each reduced to 0.5 magnification with respect to the longitudinal and lateral dimensions and copied, the resulting images are sequentially arranged on a single paper sheet P of the same size as the documents D1 to D4 by steps 1 to 4, and the images are transferred to the paper sheet P by a repetitive operation. In FIG. 1B, only the longitudinal dimension of each document is reduced to 0.25 magnification while, in FIG. 1C, only the lateral dimension is reduced to 0.33 magnification. In FIG. 1D, the image "1" printed on the document D1 only is reduced to 0.5 magnification as in FIG. 1A, then subjected to image processing and/or changed in color, and then transferred. Any of the processes shown in FIGS. 1A to 1C may of course be adopted as desired.

Referring to FIG. 2, a digital copier capable of performing any of the processes shown in FIGS. 1A to 1D is shown. The copier, generally 10, includes a glass platen 12 on which an automatic document feeder (ADF) 14 is mounted. A scanner 16 including a lamp 18 is disposed below the glass platen 12. While the scanner 16 is moved to the right as viewed in the figure, an imagewise reflection from a document D is incident to an imaging device 26 by way of mirrors 20, 22 and 24. The resulting image signal modulates a laser beam 28a which issues from a laser 28. The modulated laser beam 28a scans the surface of a photoconductive drum 32 to provide an electrostatic latent image thereon. As a paper sheet P fed from a desired cassette 34 is driven by a register roller pair 36, toner deposited on the latent image at a developing section (not shown) is transferred to the paper sheet P. Subsequently, when the paper sheet P reaches a fixing device 38 which is made up of a fixing roller 38a and a pressing roller 38b, the toner is fixed on the paper sheet P by heat. A selector pawl 40 for switching over the destination of a paper sheet P is located at the outlet side of the fixing device 38. When images are to be sequentially transferred to a single paper sheet P, the selector pawl 40 is actuated to direct the paper sheet P to an intermediate tray 42. From the intermediate tray 42 the paper sheet P is transported again to the register roller pair 36. As all the images are reproduced on the single paper sheet P by such a repetitive procedure, the selector pawl 40 is so positioned as to discharge the paper sheet or copy P to a copy tray 44.

Figure 3:
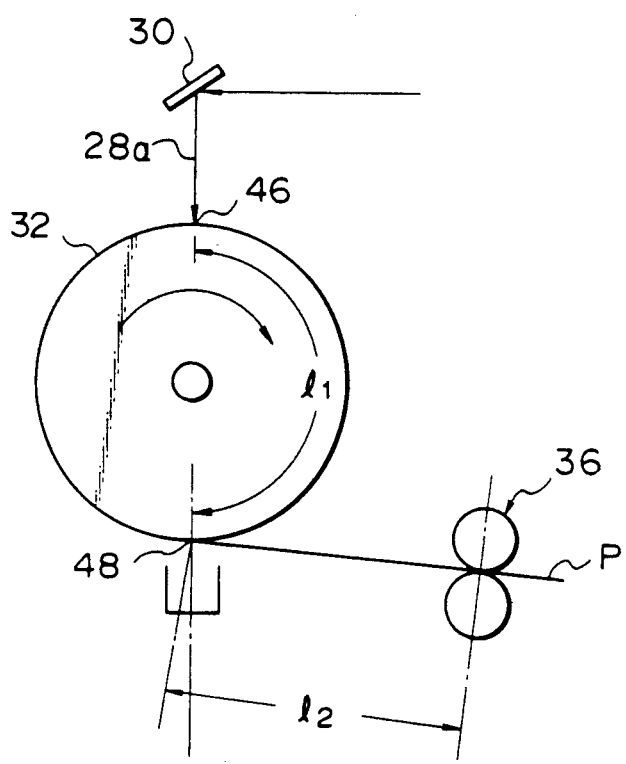
FIG. 3 is a fragmentary side elevation schematically showing an image transferring condition associated with a photoconductive drum and a paper feeding condition.

FIG. 3 schematically shows a relationship between the transfer of a toner image from the drum 32 and the feed of a paper sheet P. As shown, assume that the angular distance between an exposure station 46 where the laser beam 28a is incident to the drum 32 and a transfer station 48 where a toner image is transferred from the drum 32 to a paper sheet P is $l_1$, and the distance between the register roller pair 36 and the transfer station 48 is $l_2$. Further, assume that the peripheral speed of the drum 32 is v millimeters per second. Then, a toner image will be transferred from the drum 32 to a predetermined area of the paper sheet P only if an electromagnetic clutch associated with the register roller pair 36 is coupled upon the lapse of a period of time $t_1$ after the appearance of a valid subscan period signal FGATE, the period of time $t_1$ being expressed as:

$$t_1 = (l_1 - l_2)/v \qquad \text{Eq. (1)}$$

and then the feed of a paper sheet P is started.

Figure 5A:
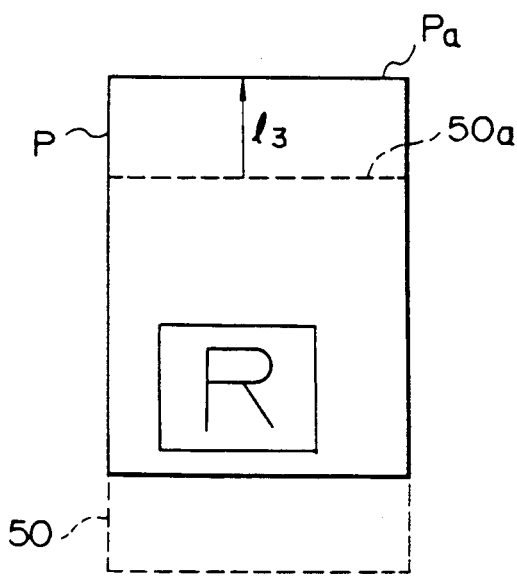
FIGS. 5A and 5B are schematic diagrams each showing a different condition in which an image is shifted in the subscanning direction.
Figure 5B:
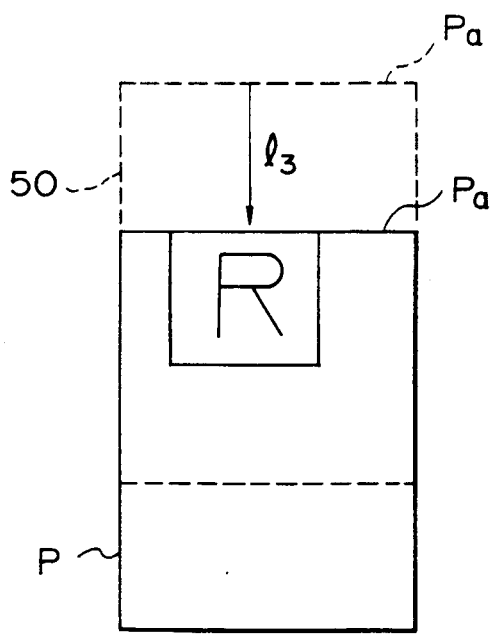

As shown in FIG. 5A, when it is desired to shift a document image 50 downward relative to the leading edge Pa of the paper sheet P, the distance of shift $l_3$ is in the negative direction, i.e., $l_3 < 0$ with respect to the leading edge 50a. Further, when it is desired to shift the image 50 upward as shown in FIG. 5B, the distance $l_3$ is in the positive direction, i.e. $l_3 > 0$. In such cases, the Eq. (1) is modified as follows:

$$t_1 = (l_1 - l_2 + l_3)/v \qquad \text{Eq. (2)}$$

In the condition of $l_3 < 0$, the period of time $t_1$ sometimes becomes shorter than zero. Then, considering an interval $t_2$ between the appearance of a scanner start signal SST shown in FIG. 4 and the appearance of a signal FGATE as a reference, a period of time $t_3$ produced by:

$$t_3 = t_2 + t_1 \qquad \text{Eq. (3)}$$

is determined and a clutch signal CLT for the register roller pair 36 is turned on upon the lapse of such a period of time $t_3$ after the appearance of the signal SST. If the period of time $t_3$ is shorter than zero, the scanner start signal SST needs only to be generated when the period of time $t_3$ expires after the turn-on of the clutch signal CLT.

The signal FGATE appears when the scanner 16 reaches the leading edge Da of the document D. Although the interval $t_2$ between the appearance of the scanner start signal SST and the appearance of the signal FGATE is determined beforehand at the designing stage, it differs from one copier to another due to machining errors of various sections and, moreover, it is changed in association with magnification m. Hence, the interval $t_2$ has to be corrected to match with a particular condition.

Figure 6A:
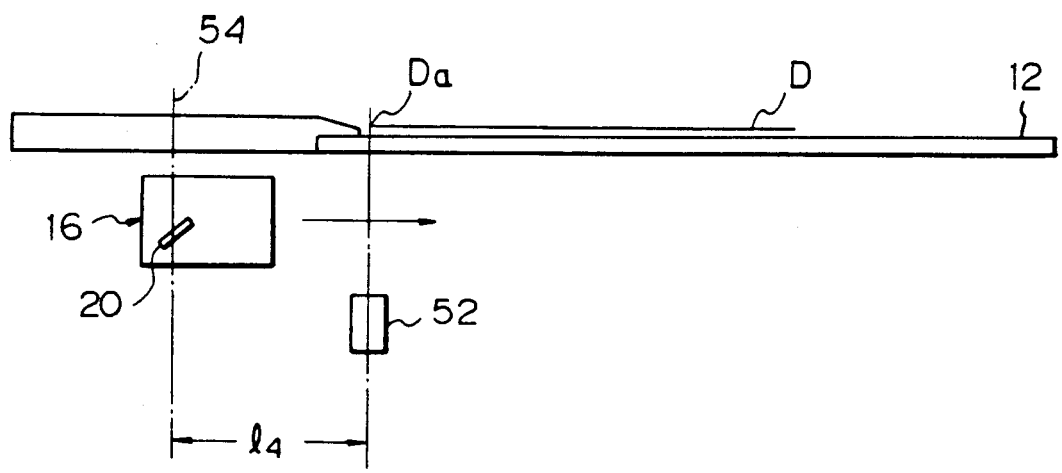
FIGS. 6A and 6B each illustrates a different implementation for determining a period of time which is needed for a scanner to travel a predetermined distance.
Figure 6B:
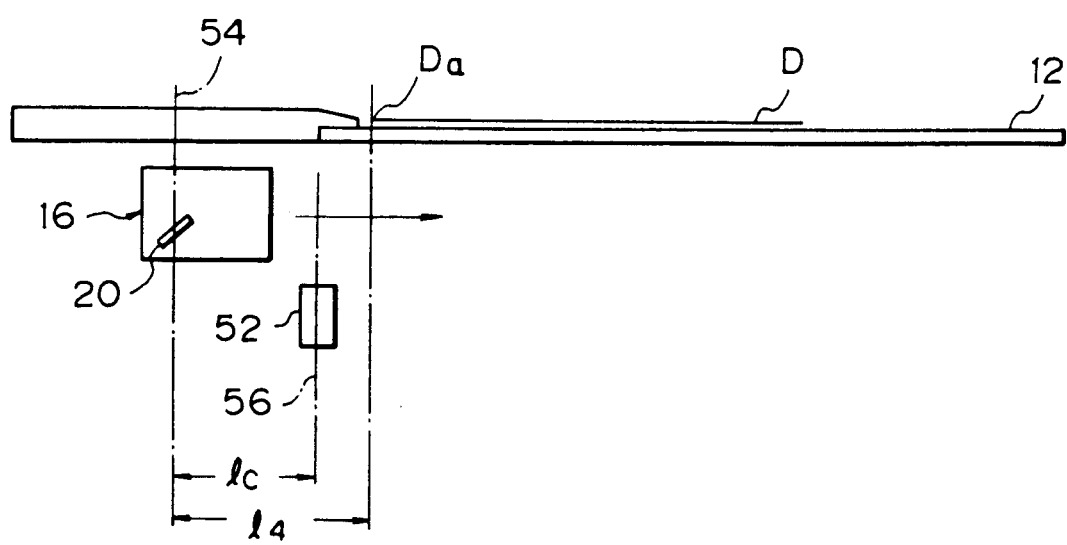

FIGS. 6A and 6B each shows a different implementation for measuring a period of time necessary for the scanner 16 to move from an original position or home position to a predetermined position, such a period of time being adapted for the correction of the interval $t_2$. In FIG. 6A, a sensor 52 is located in a position where it aligns with the leading edge Da of a document D so as to determine that the scanner 16 has moved from its home position 54 to the leading edge Da of a document D. In FIG. 6B, the sensor 52 is located at a predetermined position 56 between the home position 54 of the scanner 16 and the leading edge Da of a document D to thereby determine that the scanner 16 has moved away from the position 56. A period of time tm needed for the scanner 16 to move from the original position 54 to the position where the sensor 52 produces an output is determined in terms of the number of clock pulses, for example. This period of time tm is held by a memory or the like and used to adjust the period of time $t_2$ for the next scanning. Such a procedure allows the signal FGATE to be produced at an accurate timing with no regard to the machining errors and the change of magnification.

In detail, with the implementation shown in FIG. 6A, assuming that a period of time needed for the scanner 16 to travel a distance $l_4$ is $t_4$ and that the correction coefficient is k, there holds:

$$t_4 = k \cdot tm = t_2 \qquad \text{Eq. (4)}$$

Therefore, k is produced by:

$$k = t_4/tm \qquad \text{Eq. (5)}$$

Then, correction is effected by using:

$$t_2 = k \cdot tm \qquad \text{Eq. (6)}$$

In the case of FIG. 6B, k is determined by:

$$k = (t_4 \cdot lc)/(tmc \cdot l_4) \qquad \text{Eq. (7)}$$

where lc is the reference distance between the original position 54 and the predetermined position 56, and tmc is a partial travel time associated with the reference distance lc. Then, correction is effected by using the Eq. (6).

For the first copying operation, the scanner 16 may be driven for a test scan in response to the turn-on of a power supply to determine the time tm or tmc, followed by the previously discussed correction. Further, the values k determined by the successive scans may be sequentially averaged to correct a condition for each subsequent scan. More specifically, both of a correction coefficient k determined by the current scanning and a correction coefficient kp determined before by the previous scanning may be used to produce a correction coefficient kn for the next scanning, as follows:

$$kn = 0.4 \times kp + 0.6 \times k \qquad \text{Eq. (8)}$$

Figure 7:
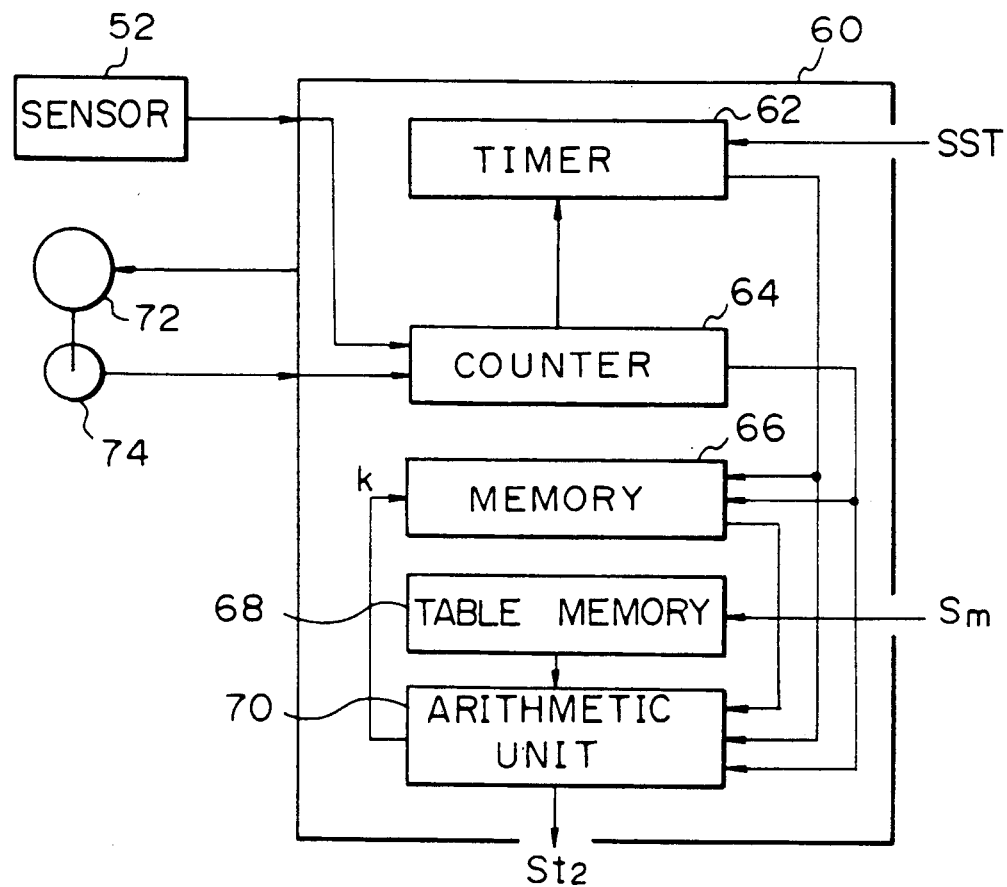
FIG. 7 is a schematic block diagram showing a preferred embodiment of the present invention.

Referring to FIG. 7, a circuit arrangement for implementing the correction stated above is shown. In the figure, a scanner control 60 includes a timer 62, a counter 64, a memory 66, a table memory 68, and an arithmetic unit 70. Applied to the counter 64 are a sense output of the sensor 52 and output pulses of a pulse generator 74 associated with a motor 72 which is adapted to drive the scanner 16. The counter 64, therefore, counts the distance $l_4$ or $lc$ which the scanner 16 travels from the original position 54 to the sensor 52. Started by a scanner start signal SST, the timer 62 determines the period of time tm or tmc associated with the distance $l_4$ or $lc$. The distance and time so determined are stored in the memory 66. The table memory 68 stores in a table standard values of the period of time $t_2$ which is dependent upon the magnification m. The data stored in the table memory 68 are read out on the basis of a set magnification signal Sm while, at the same time, the arithmetic unit 70 performs the previously stated arithmetic operations by using $t_2$ and the data stored in the memory 66. The resulting correction coefficient is written in the memory 66, and a signal $St_2$ representative of the corrected time $t_2$ is fed out.

Figure 4:
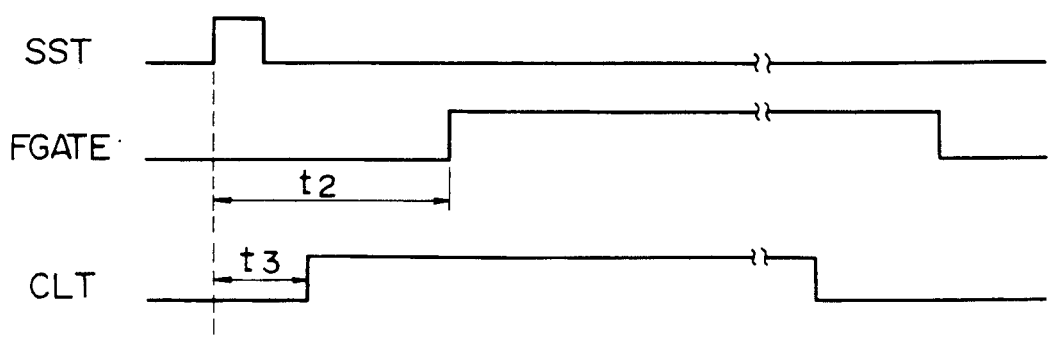
FIG. 4 is a timing chart showing a relationship between signals.
Figure 9:
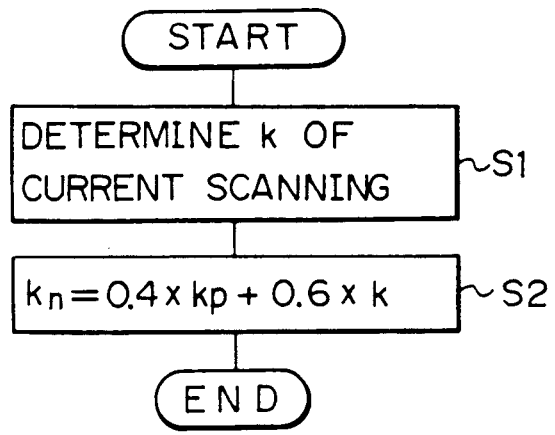

The measurements discussed above and the control over the system shown in FIG. 4 may be implemented by a microcomputer. Specifically, a microcomputer may be programmed to perform the operations shown in FIGS. 8 and 9. In FIG. 8, whether $(l_1 - l_2) + l_3$ is greater than zero is determined (step S1) and, if the answer is YES, the register roller pair is turned on upon the lapse of the period of time $t_1$ after the appearance of a signal FGATE (step S2). If the answer of the step S1 is NO, whether $t_3$ is greater than zero is determined (step S3) and, if the former is greater than the latter, the register roller pair is turned on upon the lapse of the period of time $t_3$ after the generation of the scanner start signal SST (step S4). If $t_3$ is not greater than zero as decided in the step S3, a scanner start signal SST is generated upon the lapse of the period of time $t_3$ after the turn-on of the register roller pair (step S5). In FIG. 9, k of the current scanning is determined (step S1) and, then, $kn = 0.4 \times kp + 0.6 \times k$ is performed (step S2) to use the value kn for the next scanning.

Figure 10A:
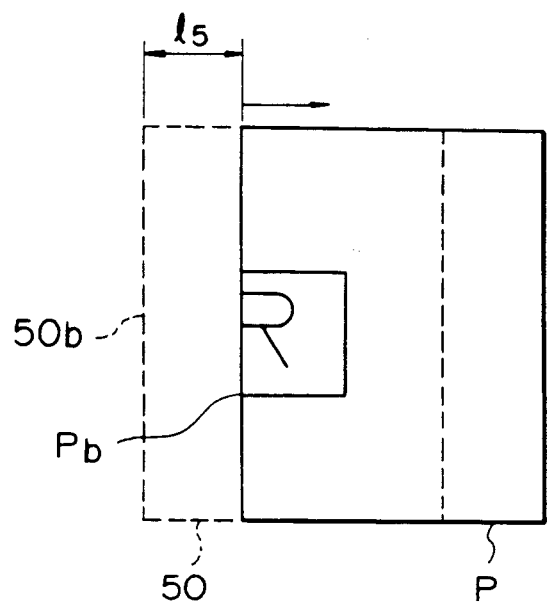
FIGS. 10A and 10B each shows a different condition in which an image is shifted in the main scanning direction.
Figure 10B:
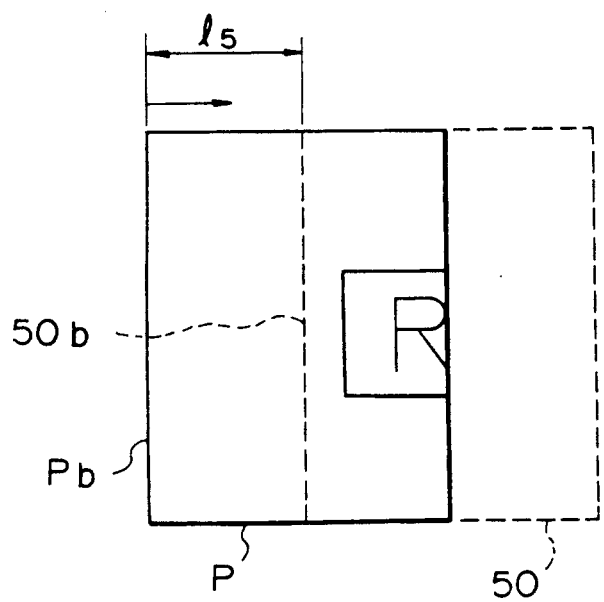
Figure 11:
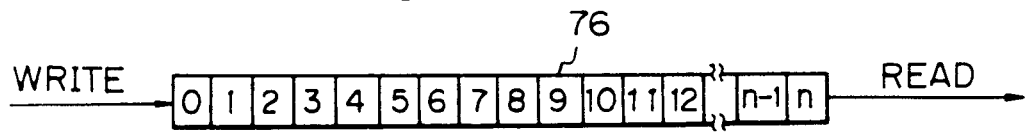
FIG. 11 illustrates a construction of a memory.
Figure 12:
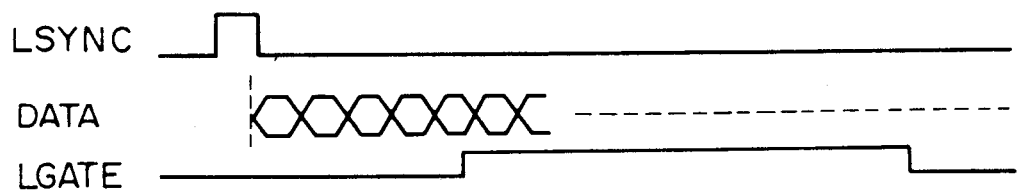
FIG. 12 is a timing chart showing how data are written in and read out of the memory.

FIGS. 10A and 10B each shows a case wherein the image 50 is shifted in the main scanning direction relative to the paper sheet P. In FIG. 10A, considering one side edge 50b of the image 50 as a reference, the amount of shift $l_5$ is in the positive direction, i.e. $l_5 > 0$. In FIG. 10B, the amount of shift $l_5$ is in the negative direction, i.e. $l_5 < 0$. In the light of this, as shown in FIG. 11, a shift register or similar memory 76 capable of accommodating image data on one full scanning line is used. Image data are sequentially written in the leading address and the successive addresses of the memory 76. In the condition of $l_5 > 0$, the image data are sequentially read out of the memory 76, beginning with the address which is associated with $l_5$, so that an image to be transferred may be completed by those data. In the case of $l_5 < 0$, it is necessary to write image data beginning with the address associated with $l_5$ and to read them out beginning with the leading address. It is to be noted that, as shown in FIG. 12, for both of the write-in and the read-out from the memory 76 image data DATA are accessed in synchronism with a main scan sync signal LSYNC and only an effective range is extracted by a horizontal scan mask signal LGATE. If desired, default data may be stored in the addresses of the memory 76 which are not associated with the effective range, thereby invalidating the read-out.

Figure 13:
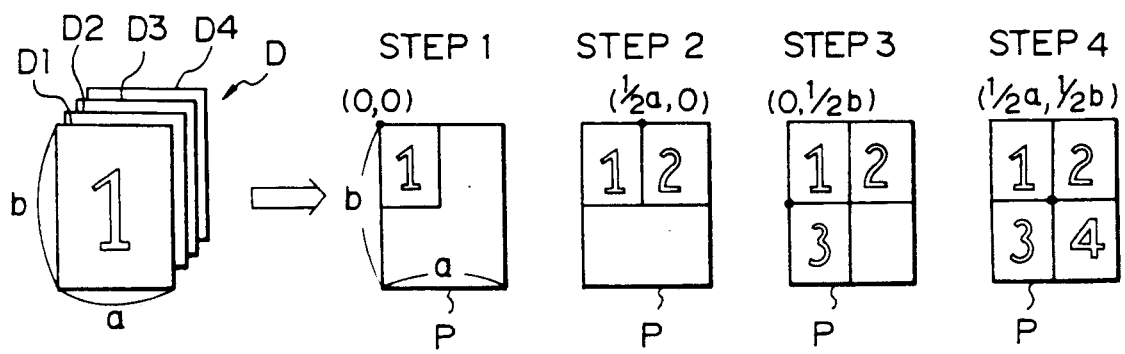
FIG. 13 schematically shows a sequence of steps for reproducing images of a plurality of documents in a reduced size on a single paper sheet.

When the image transfer shown in FIG. 1A is to be effected on the basis of the procedure described above, further processing which will be described is needed. Specifically, FIG. 13 shows an arrangement of reduced images which are transferred to a paper sheet P. First, the document D1 is reduced to 0.5 magnification. Then, assuming that the coordinates in the lateral direction and longitudinal direction are x and y, respectively, and the lateral dimension and longitudinal dimension of the paper sheet P are a and b, respectively, the document D1 is reproduced on the paper sheet P with amounts of shift of $x=0$ and $y=0$ in the step 1. In the step 2, the document D2 is reduced in the same manner and then reproduced on the paper sheet P with amounts of shift of $x = a \cdot \frac{1}{2}$ and $y = 0$ and by using the intermediate tray 42 shown in FIG. 2. In the step 3, the document D3 is reduced in the same manner and the reproduced on the paper sheet P with amounts of shift of $x = 0$ and $y = b \cdot \frac{1}{2}$ as in the step 2. Further, in the step 4, the document D4 is reduced in the same manner and then reproduced on the paper sheet P with amounts of shift of $x = a \cdot \frac{1}{2}$ and $y = b \cdot \frac{1}{2}$. It will be seen that the values of the coordinates x and y may be varied to arrange the images of the documents D1 to D4 on the paper sheet P in any desired manner other than shown in FIG. 13.

Assume that the magnification and the number of images to be arranged in the lateral direction are Xm and Xn, respectively, the magnification and the number of images to be arranged in the longitudinal direction are Ym and Yn, respectively, the lateral dimension and longitudinal dimension of the document D are a and b, respectively, and the lateral dimension and longitudinal dimension of the paper sheet P are c and d, respectively. Then, generally, the magnifications Xm and Ym are produced by:

$$Xm = (c/Xn)/a \qquad \text{Eq. (9)}$$

$$Ym = (c/Yn)/b \qquad \text{Eq. (10)}$$

Figure 14:
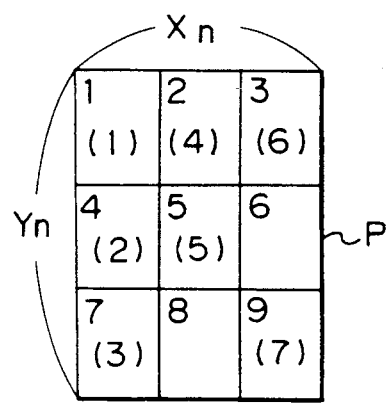
FIG. 14 shows areas defined on a paper sheet for arranging images and negative numbers assigned to documents.

It follows that documents D of any size can be reproduced on a paper sheet of any size simply by determining the various numerical values of the Eqs. (9) and (10) as desired. In this instant, as shown in FIG. 14, the areas defined on the paper sheet P may be designated by numbers 1 to 9 and negative numbers (1) to (7) of documents D may be specified in association with the numbers 1 to 9, thereby transferring desired negatives to any desired areas.

Such a scheme may be implemented by a main controller in the form of a microcomputer which executes decisions in response to key inputs on an operation board while sequentially displaying data on a liquid crystal display, for example. In the case where the microcomputer automatically determines the condition of image transfer shown in FIG. 14, it performs decisions and controls shown in FIGS. 15 and 16 based on a predetermined program.

Figure 15:
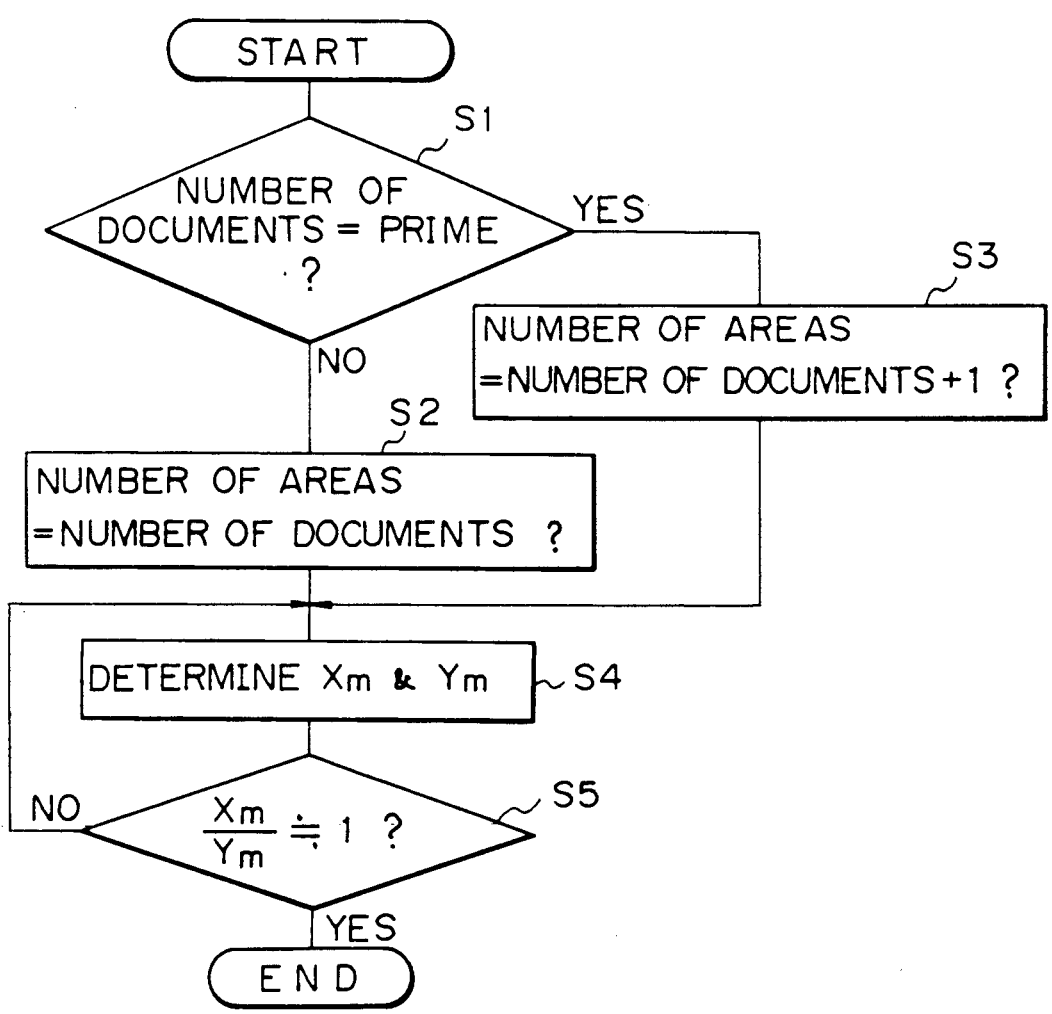
FIGS. 15 and 16 are flowcharts demonstrating a procedure for controlling the transfer of images in a reduced size.

Specifically, in FIG. 15, whether the number of documents to be reproduced is a prime is determined (step S1) and, if the answer is NO, it is decided that the number of areas is equal to the number of documents (step S2). If the answer of the step S1 is YES, it is decided that the number of areas is equal to the number of documents plus 1 (step S3) and, based on this, multiples Xn and Yn are estimated and, then, Xm and Ym are determined by using the Eqs. (9) and (10) (step S4). Then, whether Xm/Ym is nearly equal to 1 is determined (step S5). The steps S4 and S5 are repeated until the answer of the step S5 becomes YES, thereby determining magnifications Xm and Ym for which the answer of the step S5 becomes YES. The amounts of shift in the X and Y directions are individually determined by using for a reference pitches xp and yp of the following equations:

$$Xp = c/Xn \qquad \text{Eq. (11)}$$

$$Yp = d/Xn \qquad \text{Eq. (12)}$$

When the magnifications Xm and Ym so determined are not available with the copier, the copying operation may be inhibited or, alternatively, document images may be reproduced on a plurality of paper sheets by using the magnifying ability available with the copier, reproduction quality, and maximum number of document images which may be accommodated in a single paper sheet. Further, if optimum arrangements of images for the documents D and paper sheets of various sizes are stored in a memory in the form of a table, the magnifications Xm and Ym shown in FIG. 15 can be determined by using the table.

Figure 16:
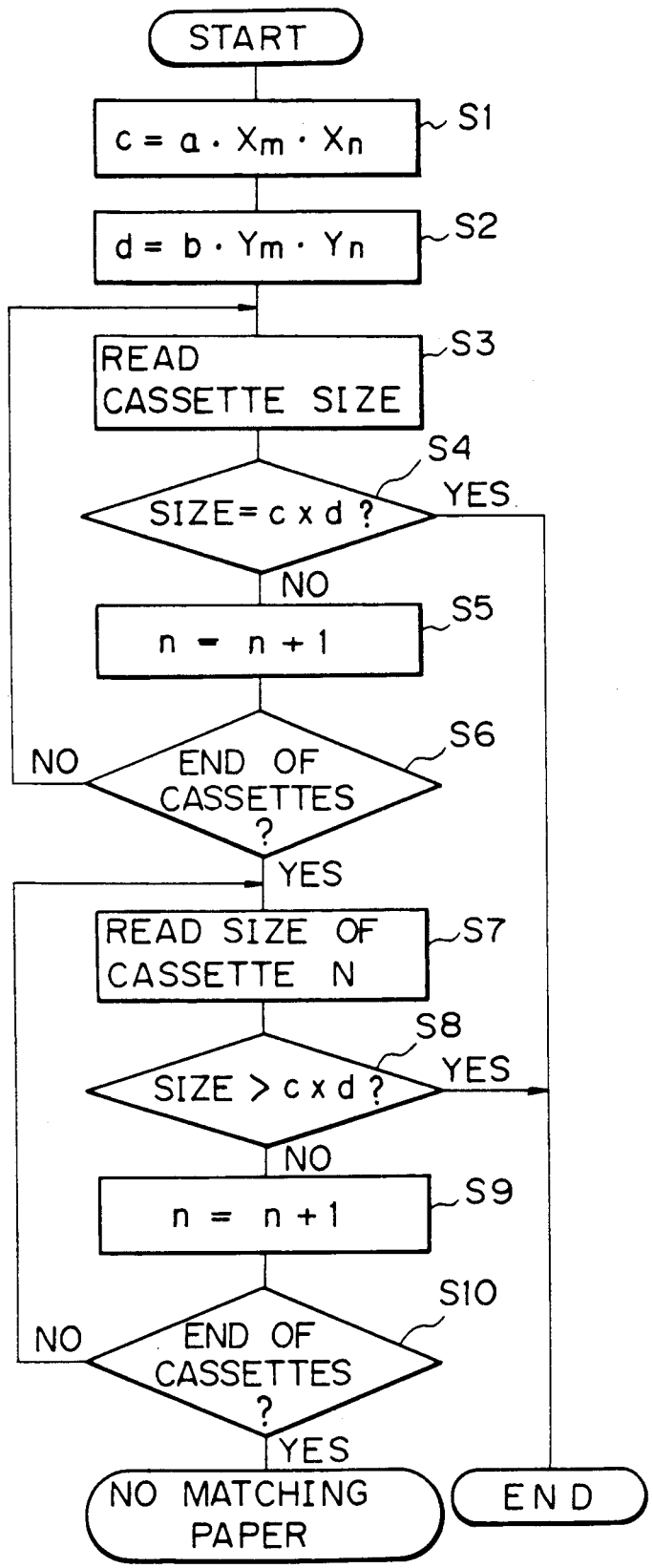

In FIG. 16, $c = a \cdot Xm \cdot Xn$ (step S1) and $d = b \cdot Ym \cdot Yn$ (step S2) are performed to determine the size of the paper sheet P. Then, the size of a cassette n is read (step S3) and whether the cassette size n is equal to $c \times d$ is determined (step S4). If the answer is NO, the cassette number is incremented by 1 (step S5). The steps S3 to S5 are repeated until the last cassette is reached (step S6). As the answer of the step S6 becomes YES, the size of the cassette n is read as in the step S3 (step S7), then whether the cassette size is greater than $c \times d$ is determined (step S8), then the cassette number n is incremented by 1 as in the step S5 (step S9), and then the steps S7 and onward are repeated until the answer of a step S10 turns from NO to YES, i.e., until the laset cassette is reached. By such an operation, a cassette for which the answer of the step S4 or S8 becomes YES is selected.

Figure 17:
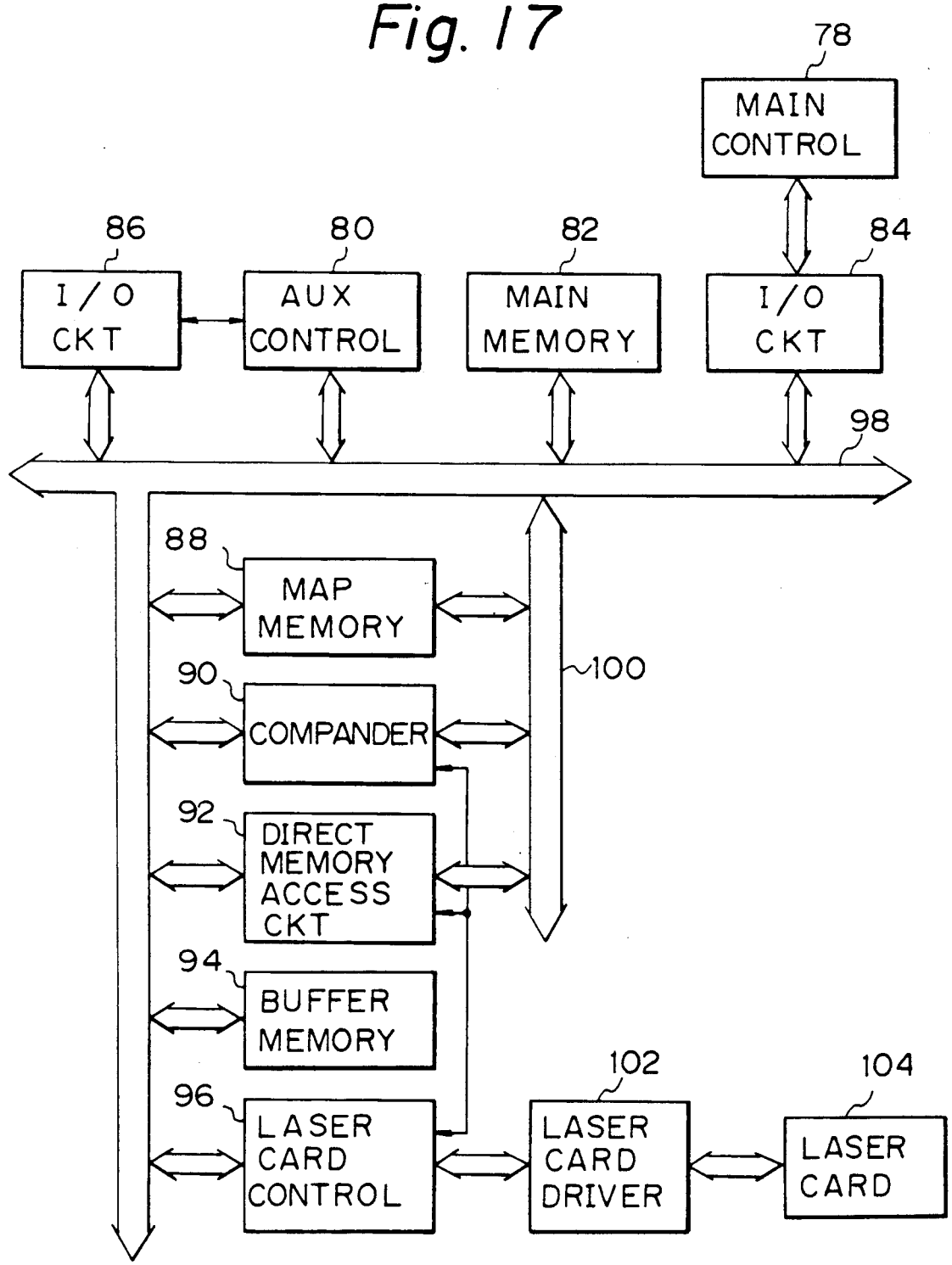
FIG. 17 is a schematic block diagram showing an alternative embodiment of the present invention.

Referring to FIG. 17, another embodiment of the present invention is shown which uses a laser card for a memory. In the figure, there are shown a main control 78 implemented by a microcomputer, an auxiliary control 80, a main memory 82, input/output (I/O) circuits 84 and 86, a map memory 88, a compander 90, a direct memory access control 92, a buffer memory 94, and a laser card control 96. These units are interconnected by a bus 98. Further, the map memory 88, compander 90 and direct memory access control 92 are interconnected by a local bus 100 to be capable of interchanging data at a high speed with no regard to the bus 98. The laser card control 96 accesses a laser card 104 via a laser card driver 102. The auxiliary control 80 executes a program stored in the main memory 82 in response to a command from the main control 78 while accessing the main memory 82 for necessary data. When image data fed through the I/O circuit 86 are developed in the map memory 88, the direct access memory control 92 transfers the data stored in the map memory 88 to the compander 90 in response to a command from the auxiliary control 80. The image data compressed by the compander 90 are stored in the buffer memory 94 and then sequentially written in the laser card 104 via the laser card control 96 and laser card driver 102. On the other hand, in response to a command from the auxiliary control 80, the laser card control 96 reads data out of the laser card 104 via the laser card driver 102 while storing them in the buffer memory 94. The direct access control 92 transfers the data from the buffer memory 94 to the compander 90. The data expanded by the compander 90 are developed in the map memory 88. For this purpose, the data are fed out to the bus 98 via the I/O circuit 86.

It follows that by collectively storing the various values and image data produced by the processing of FIGS. 15 and 16 and the numbers shown in FIG. 14 in the laser memory 104 in the form of a file and reading them out for forming a latent image on the drum 32, it is possible to accomplish image transfer analogous to that of FIG. 14 by a single transferring operation, i.e., without resorting to the intermediate tray 42 of FIG. 2. In this case, use must be made of an analog-to-digital converter for processing an output of the imaging device 26 before delivering it to the bus 98, and a digital-to-analog converter for converting image data read out into an analog signal and feeding it as a modulating signal to the laser 28, in addition to the various structural parts and elements shown in FIG. 2.

Figure 18:
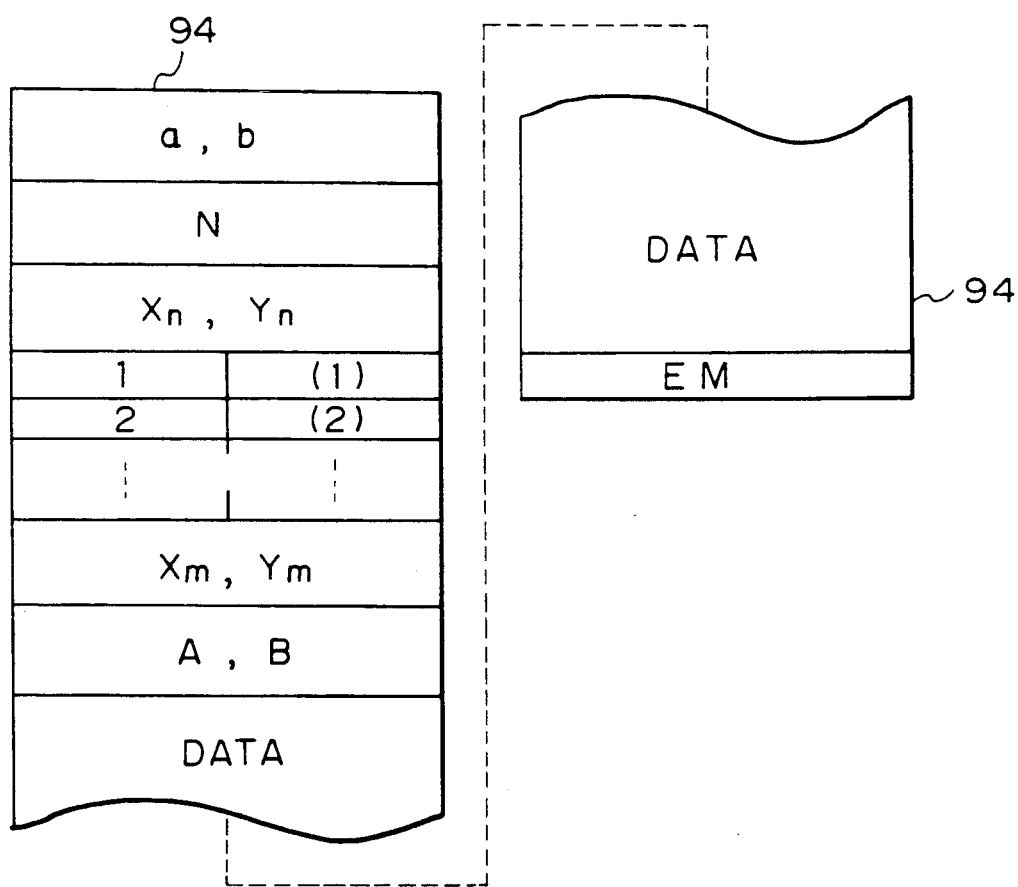
FIG. 18 is a map representative of data stored in a laser card.

FIG. 18 shows data stored in the laser card 104. As shown, stored in the various addresses of the laser card 104 are the dimensions a and b, the number N of documents D, the number of areas Xn and Yn of a paper sheet P, the area numbers 1, 2 and so on, the negative numbers (1), (2) and so on of the documents D, the magnifications Xm and Ym, the longitudinal and lateral dimensions A and B of images, the image data DATA, and end mark EM, etc.

In summary, it will be seen that in accordance with the present invention a period of time needed for a scanner to travel from its original position to a predetermined position is measured and memorized and used to correct the subsequent scanning condition. This allows any variation in the scanning timing due to machining errors and a change of magnification, for example, to be automatically corrected, causing scanning to occur at an accurate timing at all times.

Various modifications will become possible for those skilled in the art after receiving the teachings of the present disclosure without departing from the scope thereof.

What is claimed is:

1. A digital copier for reading images printed on a plurality of documents by use of document reading means and reproducing the read images in a desired arrangement on a single paper sheet which is transported by way of registering means, comprising:

data processing means for determining, in the event of a scanning movement of said document reading means, a period of time needed for said document reading means to move from a home position of said document reading means to a predetermined position and holding data representative of the determined period of time;

wherein said determination is first made upon the initial turn-on of power to said document scanning means by operation of a test scan and wherein said held data is adjusted by said data processing means based upon an averaging from subsequent scans; and correcting means for correcting a variation in a scanning timing of said document reading means on the basis of the held data.

2. A digital copier as claimed in claim 1, wherein the predetermined position is a position where a leading edge of the document is located.

3. A digital copier as claimed in claim 1, wherein the predetermined position is a position which is closer to the home position of said document reading means than a position where a leading edge of the document is located.

4. A digital copier for reading images printed on a plurality of documents by use of document reading means and reproducing the read images in a desired arrangement on a single paper sheet which is transported by way of registering means, comprising:

data processing means for determining, in the event of a scanning movement of said document reading means, a period of time needed for said document reading means to move from a home position of said document reading means to a predetermined position and holding data representative of the determined period of time;

wherein said determination is first made upon the initial turn-on of power to said document scanning means by operation of a test scan and wherein a correction coefficient kn for a next scanning is produced by averaging both a correction coefficient k determined by a current scanning and a correction coefficient kp determined by a previous scanning; and correcting means for correcting a variation in a scanning timing of said document reading means on the basis of the held data.

* * * * *